(12) United States Patent
Goto et al.

(10) Patent No.: US 9,977,957 B2
(45) Date of Patent: May 22, 2018

(54) METHOD AND SYSTEM FOR IDENTIFYING CHARACTERS ON A VALUABLE MEDIUM

(71) Applicant: GLORY LTD., Himeji-shi, Hyogo (JP)

(72) Inventors: Masanori Goto, Himeji (JP); Motoko Kuroiwa, Himeji (JP); Kenta Shibata, Himeji (JP)

(73) Assignee: GLORY LTD., Himeji-shi, Hyogo (JP)

( * ) Notice: Subject to any disclaimer, the term of this patent is extended or adjusted under 35 U.S.C. 154(b) by 185 days.

(21) Appl. No.: 14/770,249

(22) PCT Filed: Feb. 28, 2013

(86) PCT No.: PCT/JP2013/055552
§ 371 (c)(1),
(2) Date: Aug. 25, 2015

(87) PCT Pub. No.: WO2014/132414
PCT Pub. Date: Sep. 4, 2014

(65) Prior Publication Data
US 2016/0012288 A1    Jan. 14, 2016

(51) Int. Cl.
*G06K 9/00* (2006.01)
*G06K 9/38* (2006.01)
*G06K 9/62* (2006.01)

(52) U.S. Cl.
CPC ..... *G06K 9/00463* (2013.01); *G06K 9/00523* (2013.01); *G06K 9/00536* (2013.01);
(Continued)

(58) Field of Classification Search
CPC ......... G06K 2209/015; G06K 9/00463; G06K 9/00523; G06K 9/00536; G06K 9/38; G06K 9/6255
See application file for complete search history.

(56) References Cited

U.S. PATENT DOCUMENTS

| 6,690,824 | B1 | 2/2004 | Stringa |
| 8,929,640 | B1 * | 1/2015 | Mennie ............ G06K 9/00469 382/135 |

(Continued)

FOREIGN PATENT DOCUMENTS

| JP | 3-102470 | 4/1991 |
| JP | 2985893 B2 | 10/1999 |

(Continued)

OTHER PUBLICATIONS

Guo, Junfang, Yanyun Zhao, and Anni Cai. "A reliable method for paper currency recognition based on LBP." Network Infrastructure and Digital Content, 2010 2nd IEEE International Conference on. IEEE, 2010.*

(Continued)

*Primary Examiner* — Nirav G Patel
(74) *Attorney, Agent, or Firm* — Renner, Kenner, Greive, Bobak, Taylor & Weber

(57) ABSTRACT

A character recognition method for recognizing a character printed over a background pattern on a valuable medium includes acquiring a character image captured by capturing the character printed on the valuable medium; evaluating a degree of similarity between the character image and each template image, the template image having been obtained beforehand by capturing each character that had a possibility of having been printed on the valuable medium and of which background area is evenly filled; and determining that the character corresponding to the template image showing the highest degree of similarity at the evaluating is the character included in the character image.

10 Claims, 10 Drawing Sheets

(52) U.S. Cl.
CPC ............ *G06K 9/38* (2013.01); *G06K 9/6255* (2013.01); *G06K 2209/015* (2013.01)

(56) References Cited

U.S. PATENT DOCUMENTS

2007/0263930 A1    11/2007  Ito
2012/0154561 A1*   6/2012   Chari ...................... H04N 7/18
                                                         348/62

FOREIGN PATENT DOCUMENTS

| JP | 2000-222574 | 8/2000 |
| JP | 2003-30586  | 1/2003 |
| JP | 2005-151455 | 6/2005 |
| JP | 2011-238279 | 11/2011 |

OTHER PUBLICATIONS

Radványi, Mihály, et al. "Mobile banknote recognition: Topological models in scene understanding." Proceedings of the 4th International Symposium on Applied Sciences in Biomedical and Communication Technologies. ACM, 2011.*

European Search Report (Application No. 13876323.0—PCT/JP2013/055552) (7 pages—dated Nov. 10, 2016).

* cited by examiner (A-1) CHARACTER IMAGE ACQUIRED FOR TEMPLATE IMAGE CREATION (A-2) CREEATION OF TEMPLATE IMAGE (FILLING OF BACKGROUND AREA)

(B-1) CHARACTER IMAGE

TEMPLATE IMAGES (CHARACTER RECOGNITION DICTIONARY DATA)

(B-2) CHARACTER RECOGNITION PROCESS (PATTERN MATCHING)

n-DIGITS   (n-1)-DIGITS

CHARACTER RECOGNITION PROCESS

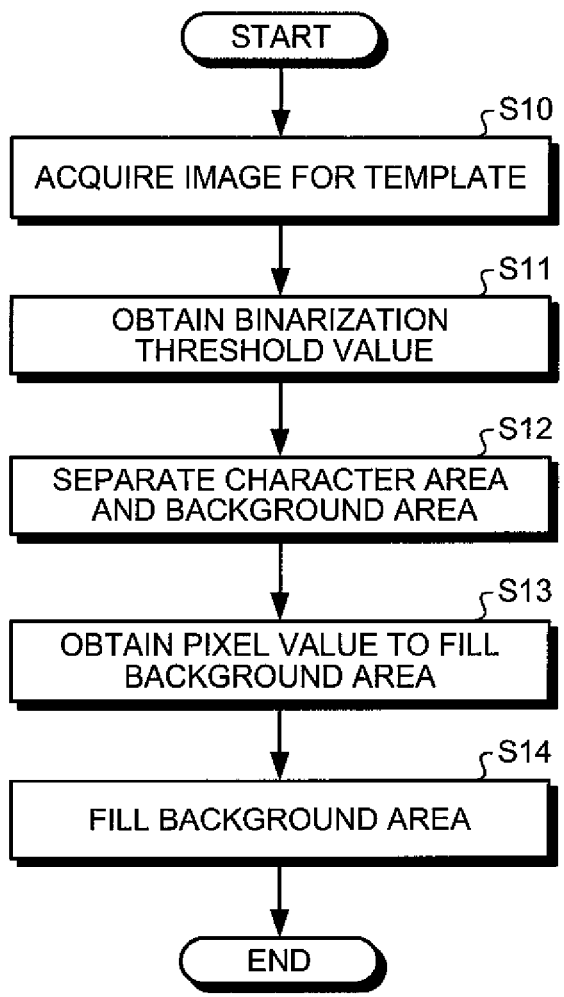

$$R = \frac{\sum_{j=0}^{N-1}\sum_{i=0}^{M-1}\left((I(i,j)-\bar{I})(T(i,j)-\bar{T})\right)}{\sqrt{\sum_{j=0}^{N-1}\sum_{i=0}^{M-1}(I(i,j)-\bar{I})^2 \times \sum_{j=0}^{N-1}\sum_{i=0}^{M-1}(T(i,j)-\bar{T})^2}}$$

AVERAGE INTENSITY VALUE OF TEMPLATE IMAGE: $\bar{T} = \dfrac{\sum_{j=0}^{N-1}\sum_{i=0}^{M-1}T(i,j)}{MN}$ AVERAGE INTENSITY VALUE OF CHARACTER IMAGE OF SAME AREA AS TEMPLATE IMAGE: $\bar{I} = \dfrac{\sum_{j=0}^{N-1}\sum_{i=0}^{M-1}I(i,j)}{MN}$

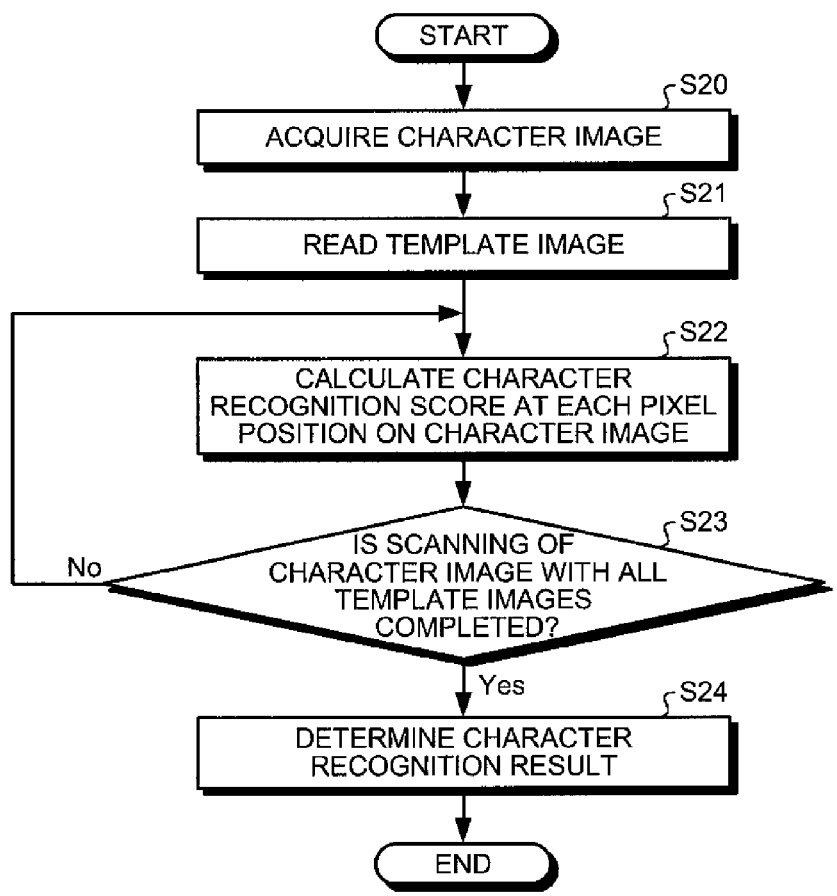

METHOD AND SYSTEM FOR IDENTIFYING CHARACTERS ON A VALUABLE MEDIUM

TECHNICAL FIELD

The present invention relates to a character recognition method and a character recognition system for recognizing characters in a serial number and the like printed on a valuable medium.

BACKGROUND ART

Conventionally, in financial institutions such as banks, character recognition apparatuses that recognize characters in the serial numbers and the like printed on valuable mediums such as banknotes and checks have been used. For example, character recognition of a serial number printed on a banknote, a check number and amount printed on a check is performed, and the obtained result is used in banknote processing and check processing. The character recognition process includes cutting out a character image of every character from an image captured by capturing a character string, extracting a feature amount of the character from the character image, and comparing the extracted feature amount with dictionary data in which feature amount of each character is registered previously.

The characters on the banknotes and checks may have a variety of patterns (designs) printed in the background. The background patterns may adversely affect character recognition, and it may lead to a misrecognition of the characters not being correctly recognized. To provide a solution to this problem, for example, Patent Document 1 discloses a technology for suppressing the adverse effect of the background pattern so that the characters printed with a background pattern can be read from an amount box in a clear band of a check. Exploiting the fact that the background pattern of the amount box is paler than the color of the characters printed in the amount box, the color border between the character and the background pattern is set as a slice level (threshold value), and the image of the amount box is binarized by using the slice level. With this technique, the background pattern can be removed from the image of the amount box and an image that includes only the characters can be obtained. Consequently, character recognition can be performed accurately.

Although it would be ideal to be able to remove only the background pattern from an image including characters and the background pattern, when image processing such as binarizing and filtering is performed on the image, image quality of even a character portion may deteriorate, leading to erroneous character recognition result. Patent Document 2 discloses a technology for avoiding the adverse effect of image processing performed to remove the background pattern. Specifically, it is evaluated, based on distribution of pixel values of the region including only the background pattern, whether the background pattern will affect character recognition. If it is determined that character recognition will not be positively affected, character recognition is performed without performing the image processing for removing the background pattern. Even if it is determined that the background pattern may positively affect character recognition, image processing for removing the background pattern is performed on the original character image, the image obtained after the image processing is evaluated by using pixel information of the background pattern. If it is determined that image processing will have no positive effects, character recognition is performed by using the original character image without performing the image processing for removing the background pattern.

CITATION LIST

Patent Document

[Patent Document 1] Japanese Patent Application Laid-open No. H3-102470
[Patent Document 2] Japanese Patent No. 4732626

SUMMARY OF INVENTION

Technical Problem

However, the conventional technology disclosed in Patent Document 1 has a drawback that, as explained above, the image processing for removing the background pattern leads to deterioration of the image quality in the character portion and thereby hinders the correct recognition of characters.

In the method disclosed in the conventional technology in Patent Document 2, there are instances where determination of the effect of the background pattern and the determination of the effect of image processing for removing the background pattern are not performed accurately. Because this determination is performed by using the pixel information of the background pattern, at times, for example, when the background pattern changes at the position of every character forming the character string of the banknote, or when the background pattern is complex, this determination may not be accurately performed.

Moreover, in other instances, erroneous character recognition may also occur when a density gradient method or the like is used in a banknote handling apparatus that performs character recognition of the serial number of each banknote while transporting the deposited banknotes one by one. For example, in the density gradient method, the density gradient is obtained by extracting edges of each character of the character image generated by capturing the serial number, the obtained density gradient in each direction is regarded as the feature amount, and the feature amount is compared with the feature amount registered as the dictionary data to perform character recognition. However, a depth of field is small when capturing the serial number of the banknote because the banknote is transported at high speed in the banknote handling apparatus, and therefore, if fluctuation of the banknote occurs in a transporting position, the characters of the serial number in the captured image may be blurred. When image processing such as edge extraction for extracting the edges of each character in such an image is performed, the feature of, for example, the line forming the character may not be accurately obtained. If a part of the character is missing, the character cannot be correctly recognized even if the feature amount is used.

The present invention has been made in order to solve the problem in the conventional technology. It is an object of the present invention to provide a character recognition method and a character recognition system by which character recognition can be performed with high accuracy even if a character string printed on a valuable medium has a pattern in the background, and the characters are recognized with high accuracy by using template images that are prepared previously in accordance with the font of the recognition target characters.

Means for Solving Problems

To solve the above problems and to achieve the above object, according to an aspect of the present invention, a character recognition method for recognizing a character printed over a background pattern on a valuable medium includes acquiring a character image captured by capturing the character printed on the valuable medium; evaluating a degree of similarity between the character image and each template image, the template image having been obtained beforehand by capturing each character that had a possibility of having been printed on the valuable medium and of which background has been filled evenly; and determining that the character corresponding to the template image showing the highest degree of similarity at the evaluating is the character included in the character image.

According to another aspect of the present invention, in the above character recognition method, the template image is an image having been obtained beforehand by separating the background area and the character by using a character-background separation threshold value determined from intensity distribution of an image having been obtained beforehand by capturing the character printed on a valuable medium, and of which all pixel values in the background area have been filled and replaced with a predetermined pixel value determined based on distribution of the pixel values of the pixels included in the background area.

According to still another aspect of the present invention, in the above character recognition method, when the character image that is a recognition target in a character recognition process is not likely to include a character therein, an image containing only the background area is included in the template image.

According to still another aspect of the present invention, in the above character recognition method, at the evaluating, the degree of similarity is evaluated by calculating a character recognition score that indicates an evaluation of the degree of similarity at each pixel position, while scanning the entire surface of the character image with each template image.

According to still another aspect of the present invention, in the above character recognition method, any value of a residual density, a square error of density, a normalized cross-correlation, and a phase only correlation, determined based on the pixel values of the template image and the character image, is used as the character recognition score.

According to still another aspect of the present invention, in the above character recognition method, the valuable medium is a banknote.

According to still another aspect of the present invention, in the above character recognition method, the template images have been prepared according to the number of fonts printed on the valuable medium.

According to still another aspect of the present invention, a character recognition system that recognizes a character printed over a background pattern on a valuable medium includes a character image acquiring unit that acquires a character image captured by capturing the character printed on the valuable medium; a character recognition score calculating unit that calculates a character recognition score that indicates an evaluation of a degree of similarity between the character image and a template image, the template image having been obtained beforehand by capturing each character that had a possibility of having been printed on the valuable medium and evenly filling a background area thereof; and a character determining unit that determines, based on the character recognition score calculated for each template image, that the character corresponding to the template image showing the highest degree of similarity is the character included in the character image.

According to still another aspect of the present invention, in the above character recognition system, the template image is an image having been obtained beforehand by separating the background area and the character by using a character-background separation threshold value determined from intensity distribution of an image captured by capturing the character printed on a valuable medium, and of which all pixel values in the background area have been filled and replaced with a predetermined pixel value determined based on distribution of the pixel values of the pixels included in the background area.

According to still another aspect of the present invention, in the above character recognition system, when the character image that is a recognition target in a character recognition process is not likely to include a character therein, an image containing only the background area is included in the template image.

Advantageous Effects of Invention

According to the present invention, a character recognition process can be performed based on a degree of similarity between a recognition target character image to be subjected to the character recognition process and each template image, which has been created by evenly filling a background area of each character that had a possibility of having been printed on a valuable medium. Because the character recognition process is performed while retaining information included in the character image and without having to perform image processing or the like for removing the background pattern, character recognition can be performed with high accuracy.

Moreover, according to the present invention, because a character-background separation threshold value, such as, for example, a binarization threshold value, for separating a character area and the background area is determined from the captured image of each character, and the background area separated by using the determined value is filled with a pixel value selected from among an average value, the median value, the mode value, and the like, of the pixel values of all the pixels included in the background area, the character recognition process can be performed with high accuracy even if the recognition target character image to be subjected to the character recognition process has a pattern in the background.

Moreover, according to the present invention, when the recognition target character image to be subjected to the character recognition process is likely to contain no character, such as in a case where the character is absent in a digit at an end of a character string because, for example, the character string is printed in differing number of digits on the valuable mediums, the determination that the character is absent can be made with high accuracy by preparing a template image previously which contains only the background pattern.

Moreover, according to the present invention, because a character recognition result is determined by evaluating the degree of similarity between the template image and the character image while searching for a position where the character in the template image and the character included in the character image match, for example, even if there is a shift in a printing position of the characters on the valuable medium, a position and an area can be set such that the entire character is included in the character image, and thereby, the character recognition process can be performed with high accuracy.

Moreover, according to the present invention, because the degree of similarity between the template image and the character image is evaluated by using any of a residual density, a square error of density, a normalized cross-correlation, and a phase only correlation, determined based on the pixel values of the template image and the character image, the character recognition process can be performed with high accuracy.

Moreover, according to the present invention, even for the recognition target banknotes having characters with various background patterns printed in the background, the character recognition process can be performed with high accuracy and without adverse effect from the background pattern because the template images of all the characters that have a possibility having been printed on the banknotes are prepared previously by filling the background area thereof with consideration to the background pattern.

Moreover, according to the present invention, because the template images are prepared corresponding to fonts of the recognition characters to be subjected to the character recognition process, for example, even if different fonts are used at plural places of the banknote, the character recognition process can be performed with high accuracy by using the template images corresponding to the font of each serial number.

BRIEF DESCRIPTION OF DRAWINGS

FIG. 7 is a flowchart showing how the template image is created.

FIG. 10 is a flowchart of the character recognition method performed by using the template images.

DESCRIPTION OF EMBODIMENTS

Exemplary embodiments of a character recognition method and a character recognition system according to the present invention are explained in detail below with reference to the accompanying drawings. In the character recognition method according to the present embodiment, as character recognition dictionary data to be used for character recognition, template images for all characters that valuable mediums are likely to include are prepared previously considering background patterns, and a character recognition process is performed by using those template images. In the character recognition process, pattern matching of the template image and a character image acquired from a recognition target valuable medium is performed to evaluate a degree of similarity between the two images, and the character of the template image having the highest degree of similarity is recognized as the character included in the character image.

Figure 1A:
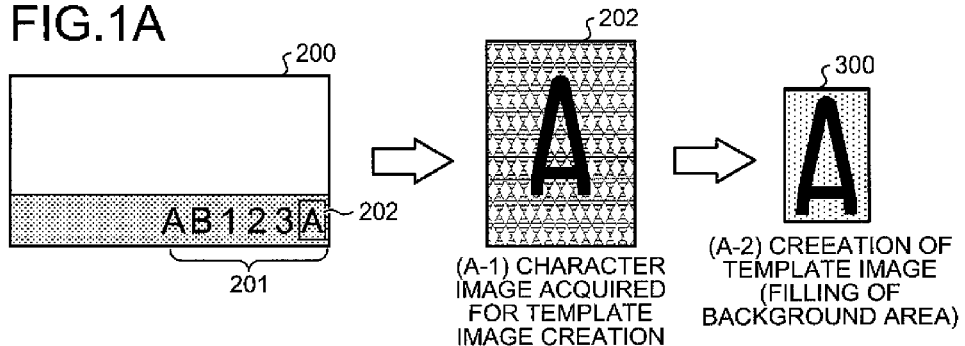
FIGS. 1A, 1B and 1C are schematic diagrams for explaining an overview of a character recognition method of recognizing a character on a valuable medium according to an embodiment of the present invention.
Figure 1B:
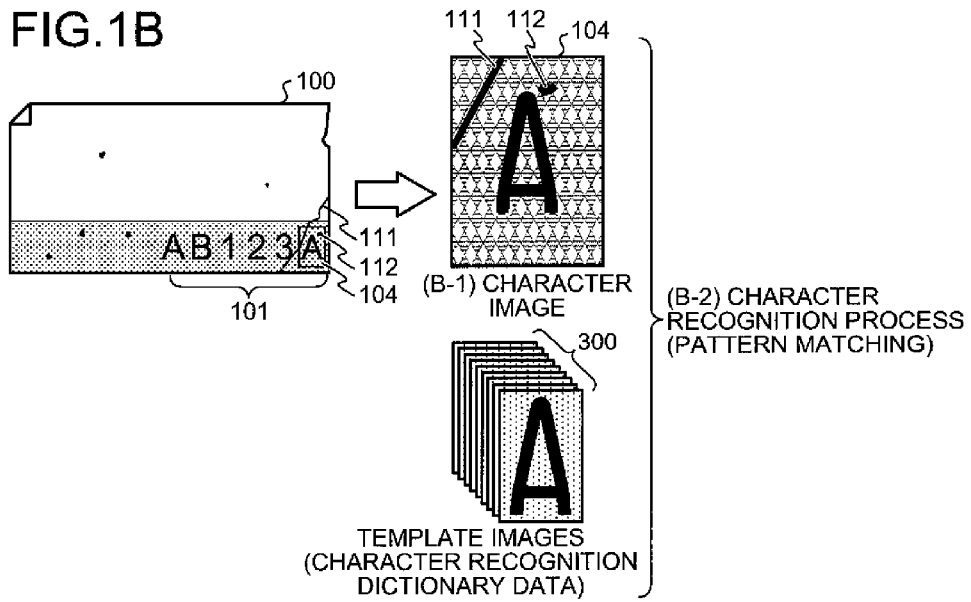
Figure 1C:
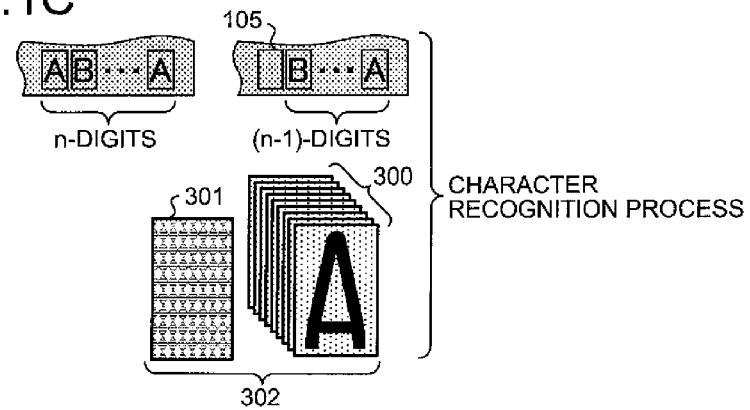

FIGS. 1A to 1C are schematic diagrams for explaining an overview of the character recognition method for the valuable medium. FIG. 1A is a drawing for explaining an overview of a process of creating the template images as the character recognition dictionary data. FIG. 1B is a drawing for explaining an overview of the character recognition process performed by using the created template images. FIG. 1C is a drawing for explaining the template images for a case in which recognition character strings to be subjected to the character recognition process have varying number of digits.

As shown in FIG. 1A, to create a template image of a valuable medium 200 in which a character string 201 has a pattern in the background, an image of the valuable medium 200 is captured, and a character image 202 is acquired from the captured image by cutting out a partial area that includes each character forming the character string 201 (A-1). The character image 202 is acquired from the valuable medium 200 that is in a good condition, without any stains or wrinkles in the area where the character string 201 is printed.

Thereafter, from the character image 202 that includes the character and the background pattern, only the background pattern is removed, and a template image 300 that includes only the character is created (A-2). First, for example, a binarization threshold value is determined as a character-background separation threshold value from intensity distribution based on pixel values of pixels forming the character of the character image 202 and pixel values of pixels forming the background pattern of the character image 202; the character and the background area are separated by using this threshold value. The separated background area is then filled with a single pixel value to create the template image 300. Specifically, for example, based on a histogram of the pixel values of the pixels forming the background area, a pixel value equivalent to a median value or an average value is used for filling the background area. In FIG. 1A, for convenience of illustration, the background area of the template image 300 is shown as being filled with a pattern, but in actuality, the background area is filled with a single color. For example, if the background area of the character image 202 has a black pattern on white backing, the background area is filled with the pixel value of a brightness selected based on the histogram of the pixel values of the background area. Only information pertaining to the brightness is used as the pixel value to select the pixel value of the background area.

A detailed method on how the pixel value to be used for filling the background area is determined shall be explained later. In the present embodiment, because the template image 300 is created by filling the background area with a single color in this manner, the template image 300 can be created regardless of the background pattern. Moreover, because the background area is not merely removed but filled with the single color selected based on pixel value information of the pixels forming the background pattern, a template image in which the background pattern is taken into consideration can be created.

In a similar manner, the character images of all the characters that have a possibility of having been on the valuable medium 200 are acquired from the valuable medium 200, and the template images 300 thereof are created. The template image 300 for each character is then registered as the character recognition dictionary data to be used thereafter in the character recognition process.

When performing the character recognition process, as shown in FIG. 1B, an image of a recognition target valuable medium 100 is captured, and a character image 104 of each character forming a character string 101 is acquired (B-1). Then, by performing pattern matching with each of the template images 300 prepared using the method shown in FIG. 1A, while scanning over the character image 104, a position where a position of the character included in the character image 104 and a position of the character of the template image 300 match are detected, and the degree of similarity between the character included in the character image 104 and the character included in the template image 300 are evaluated. A recognition result that the character of the template image 300 that shows the highest degree of similarity is the character included in the character image 104 is obtained (B-2).

For example, as shown in FIG. 1B, if the valuable medium 100 has a wrinkle 111 or a stain 112 or the like, these may also be included in the character image 104. Moreover, if a position of the transported valuable medium 100 is fluctuated while it is being captured, the captured image of the characters may be out of focus or partially bright or dark. To extract only the character and remove the background pattern from such an image, when image processing, such as, brightness and contract adjustment and edge extraction is performed on the acquired character image 104, the pixels forming the character are also affected by the image processing, possibly leading to deterioration in the image quality. In the character recognition method according to the present embodiment, however, the above-mentioned image processing is not performed on the character image 104 acquired as the recognition target, and therefore, the image quality of the character portion does not deteriorate. Moreover, character recognition can be accurately performed by evaluating the degree of similarity between the character image 104 and the template image 300 even if the captured character image 104 includes the wrinkle 111 or the stain 112, or is out of focus, or when some areas of the character image are light or dark.

Moreover, even if the font of characters is fixed, because the position where each character is printed can vary from medium to medium, the image pattern formed by the combination of the character and the background cannot be limited in advance. However, in the present embodiment, by performing character recognition by using an image, in which the background portion is filled with a background color, as a template image, the degree of similarity of the character portion can be evaluated with high accuracy.

Moreover, because the pattern matching process is performed while scanning with the template images 300 over the character image 104, even if the position of printing of the character string 101 on the valuable medium 100 is shifted from the original position, the template image 300 corresponding to the character image 104 can be correctly determined.

In the character recognition method according to the present embodiment, as shown in FIG. 1C, a blank space template image 301 is created to handle the case when a part of the character string 101 of the valuable medium 100 is likely to include a blank digit (105). Specifically, when the number of digits of the character string 101 is variable, because the character recognition process is performed in accordance with the character string with the maximum number of digits, in a character string with fewer digits, some of the digits may be blank and therefore, the areas including only the background pattern is cut out as the character images 105. The blank space template image 301 is created so that during the character recognition process, such a character image 105 is correctly recognized as a blank digit devoid of a character. For example, as shown in FIG. 10, if the number of digits in the character string printed on the valuable medium 100 is nine or ten (n=10), and as shown in FIG. 10 on the right, if the first digit at the head of the character string is likely to be blank, the image of the blank first digit is acquired to create the blank space template image 301. In this manner, by including the blank space template image 301 in the character recognition dictionary data, even if the character image 105 is acquired from the blank digit and this image includes the wrinkle 111 or the stain 112 or the like, it can be correctly recognized as a blank space.

Figure 2:
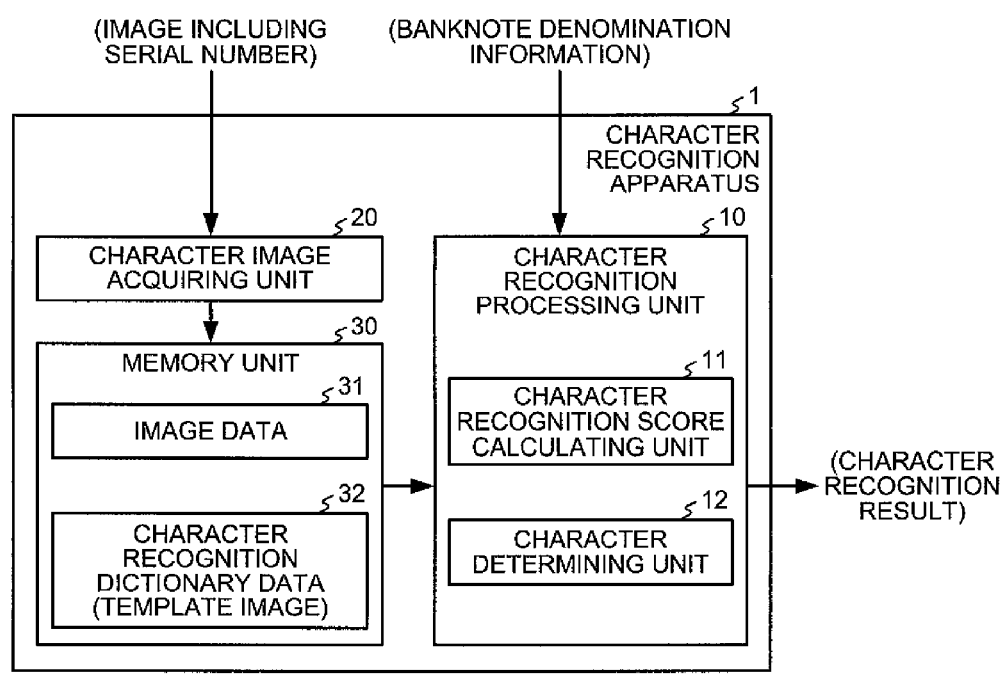
FIG. 2 is a block diagram of a character recognition apparatus according to the present embodiment.

In the following explanation, a banknote is presented as an example of the valuable medium 100, and how character recognition of a serial number printed on the banknote is performed is explained. FIG. 2 is a block diagram of a character recognition apparatus according to the present embodiment. A character recognition apparatus 1 acquires an image that includes the serial number, and denomination information including orientation information of the banknote on which the serial number is printed, and if required, rotates the acquired image based on the orientation information, and performs the character recognition process by using the character recognition dictionary data (template image) corresponding to the banknote, based on the denomination information. The character recognition apparatus 1 has a function to output to the outside the obtained character recognition result.

Figure 3A:
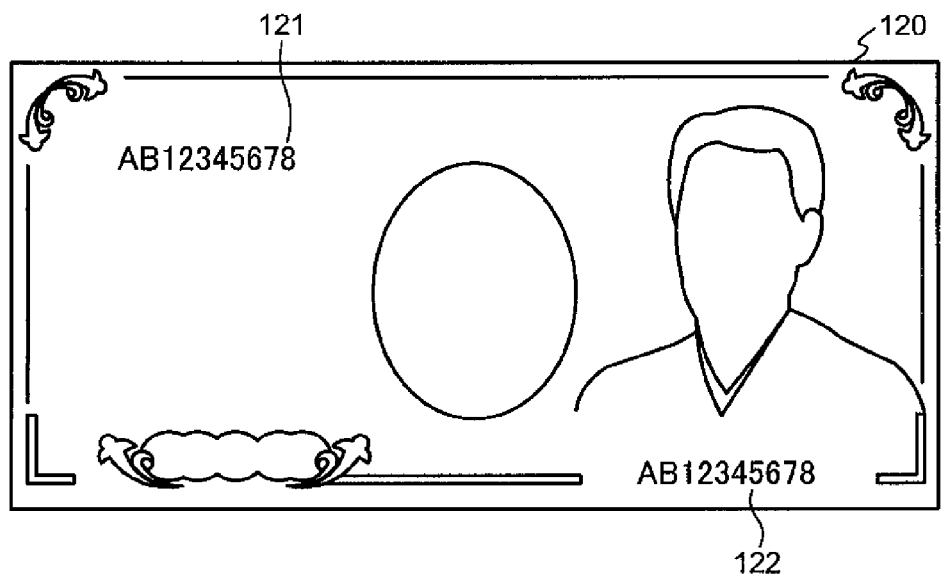
FIGS. 3A, 3B and 3C are drawings for explaining banknote images captured by capturing a banknote, a serial number image, and a character image.
Figure 3B:
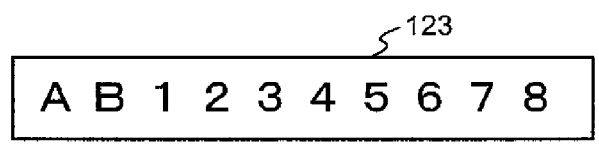
Figure 3C:

The character recognition apparatus 1 includes a character recognition processing unit 10, a character image acquiring unit 20, and a memory unit 30. The character image acquiring unit 20 has the function of acquiring from the outside the image that includes the serial number. FIGS. 3A to 3C are drawings for explaining examples of images acquired by the character image acquiring unit 20. As shown in FIG. 3A, when a banknote image 120 that includes a serial number 121 and 122 is acquired from outside, the character image acquiring unit 20 cuts out a character image cutout 124 of each digit forming the serial number 121 and 122 from this banknote image 120, as shown in FIG. 3C, and stores the character image cutout 124 as image data 31 in the memory unit 30. Moreover, when a serial number image 123 shown in FIG. 3B cut out from the banknote image 120 is acquired from the outside, the character image cutout 124 of each digit cut out from the serial number image 123 is stored as the image data 31 in the memory unit 30. Moreover, when the character image cutouts 124 of all the digits of the serial number, as shown in FIG. 3C, are acquired from the outside, the character image cutouts 124 are stored as the image data 31 in the memory unit 30. A shift in the printing position of the character is taken into consideration when cutting out the character images and therefore, the cutting area intended to be the character image is determined so that the entire character is included therein even if there is a shift in the printing position.

The memory unit 30 is a storage medium such as a hard disk, a semiconductor memory or the like, and is used for storing therein as the image data 31 the character image cutouts 124 of all the digits of the serial number acquired by the character image acquiring unit 20. Moreover, the memory unit 30 is used for storing therein character recognition dictionary data 32 to be used in the character recognition process of the character image cutout 124.

The template images used as the character recognition dictionary data 32 are stored font-wise in an associated manner with the denomination of the recognition target banknote. For example, when performing character recognition of the serial number of a Japanese 10,000 yen bill, the template images stored in an associated manner with the font of this bill are used. When performing character recognition of the serial number of a Japanese 1,000 yen bill in which a font that is different from that of the 10,000 yen bill is used, different template images stored in an associated manner with the font of this bill are used. Similarly, when a European euro banknote is the recognition target, different template images stored in an associated manner with the fonts of those banknotes are used for performing the character recognition process.

Moreover, because the template images are prepared corresponding to the font, one template image can be used for plural denominations, and plural template images can be used for one denomination. For example, if the serial number on one banknote is printed in two different fonts, two types of template images are prepared for this banknote, and character recognition of each serial number is performed by using the template images that are corresponding to the respective fonts. The template image shall be explained in detail later. If the orientations of captured image of the banknote and the template image are different, such as when a top-bottom orientation is reversed, the captured image of the banknote or the template image is rotated so that the directions thereof match. If the captured image of the banknote is tilted due to skewing or the like of the banknote, the tilt is corrected so as to match with the template image.

The character recognition processing unit 10 includes a character recognition score calculating unit 11 and a character determining unit 12. The character recognition score calculating unit 11 acquires the character image cutout 124 stored in the memory unit 30 as the image data 31 and the denomination information of the banknote, from which the character image cutout 124 is obtained, from the outside. Also, based on the acquired denomination information, the character recognition calculating unit 11 reads from the memory unit 30 the template image corresponding to the recognition target character. The character recognition score calculating unit 11 then calculates a character recognition score that evaluates the degree of similarity between the character image cutout 124 and the template image. The character determining unit 12 determines the character recognition result of the character included in the character image cutout 124 based on the character recognition score calculated by the character recognition score calculating unit 11. A method how the character recognition score is calculated and the character recognition result is determined shall be explained in detail later.

Next, how the template images that are the character recognition dictionary data 32 are created shall be explained in detail. The template images are created previously by acquiring from the banknotes in good condition without wrinkles or stains, the character images of all the characters that are likely to form the serial numbers. The created template images are then stored in the memory unit 30 as the character recognition dictionary data 32.

The template images are created for all the characters that are likely to be obtained as the character recognition result for each digit of the serial number. For example, when the serial number 121 and 122 is formed of Arabic numerals 0 to 9, template images corresponding to the numerals 1 to 9 are created. When the serial number 121 and 122 is formed of upper case English alphabets A to Z, template images corresponding to the upper case English alphabets A to Z are created. The character recognition process is performed by using numerical template images for the numerical digits and alphabetical template images for the alphabetical digits.

Moreover, when there are serial numbers 121 and 122 with differing number of digits, a blank template image is created. For example, when there are banknotes with 9-digit or 10-digit serial numbers 121 and 122, character recognition is performed with the character image cutouts 124 for ten digits. Hence, when the serial number 121 and 122 has nine digits, for example, the first digit may not have a character, and only the remaining nine digits, that is, from the second digit to the tenth digit, will include characters. That is, the character image cutout 124 of the first digit of the serial number 121 and 122 having nine digits will be an image containing only the background pattern. In this manner, the blank template image is created corresponding to the character image cutout 124 that is blank.

How the template images are created is explained by citing a specific example where the character image cutout 124 is one of the upper case English alphabets A to Z and a blank space. FIGS. 4A to 4D are drawings for explaining how the template image is created.

Figure 4A:
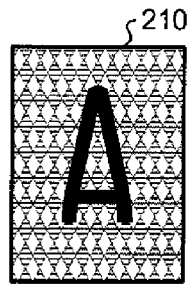
FIGS. 4A, 4B, 4C and 4D are drawings for explaining how a template image is created.

FIG. 4A is a drawing of a character image 210 for template image creation acquired from the banknote. FIG. 4A shows the character image 210 used for creating the template image for the upper case English alphabet "A", and includes the character "A" printed as the serial number 121 and 122 and the background pattern.

The character image 210 acquired from one banknote can be used as the character image 210 for template image creation. Alternatively, taking into consideration the variations in the acquired character images 210, for example, plural character images can be acquired from plural banknotes, and a character image obtained by averaging the plural character images that include the same character can be used as the character image 210 for template image creation.

Figure 4B:
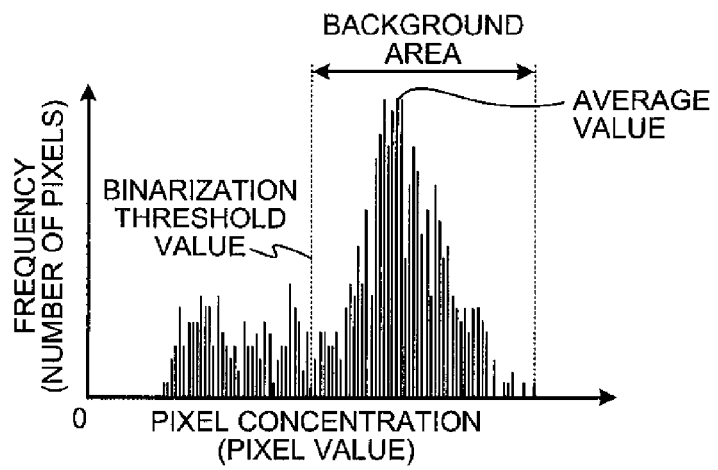
Figure 4C:
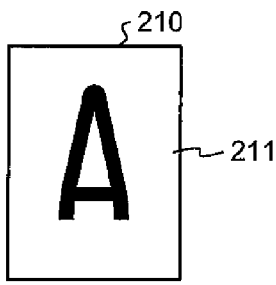

FIG. 4B is a histogram showing distribution of the pixel values of the pixels included in the character image 210 shown in FIG. 4A. The horizontal axis represents pixel density (pixel value) and the vertical axis represents a frequency (number of pixels). In this manner, the histogram of the pixel values is created from the character image 210 that includes the character and the background, and a binarization threshold value is determined. Moreover, in the area from the point and beyond the binarization threshold value on the horizontal axis, an average density value is determined.

Figure 4D:
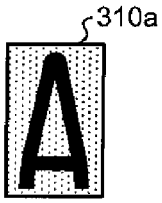

In the character image 210, the pixel area that has a pixel value greater than or equal to the binarization threshold value is identified as the background area. In case of the character image 210 shown in FIG. 4A, the area indicated in white in FIG. 4C corresponds to a background area 211. Once identified, the background area 211 is filled with the pixel value of the average density value determined from the histogram. A rectangular area including the entire character is retained and the surrounding area thereof is cut off. An image obtained in such a manner, i.e., the image shown in FIG. 4D, is used as a template image 310*a*.

Because the binarization threshold value is set such that the pixels forming the character are retained, only the pixels forming the character and some pixels forming the background pattern near the character keep the pixel values that are identical to those of the original character image 210. In contrast, the background area 211 is replaced with the pixel value equivalent to the average density value, based on the histogram of the pixel values of the pixels forming the background area 211.

The template image is similarly created for each character that is likely to form the serial number 121 and 122, by acquiring the character image and filling the background area with a single color. Moreover, because the blank template image does not include any character, the acquired character image is used as the blank template image, without performing the filling process of the background based on the histogram.

Figure 5:
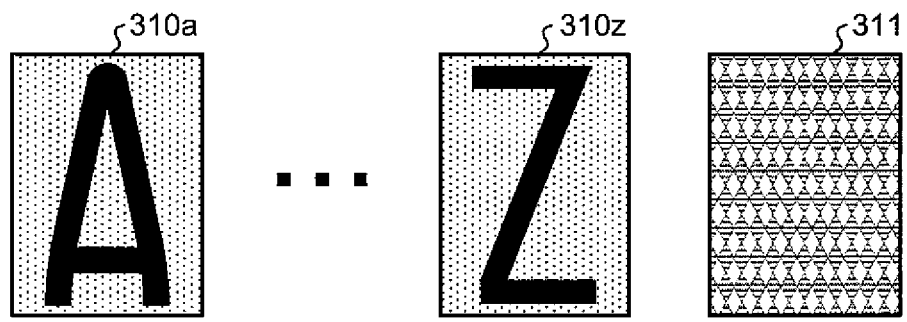
FIG. 5 depicts examples of the created template images.

FIG. 5 is a drawing of template images 310$a$ to 310$z$ for the characters and a blank template image 311 created as explained above. The template images 310$a$ to 310$z$ and the blank template image 311 are used as the character recognition dictionary data 32 for character recognition of the digit that has any of the upper case English alphabets A to Z and the blank space. Moreover, as shown in FIG. 5, from the character images 210 shown in FIGS. 4A to 4C, the images obtained by retaining the rectangle including the entire characters and removing the outer background area thereof are used as the template images 310$a$ to 310$z$ for the characters (see FIG. 8A). The size of the blank template image 311 is set matching with the size of the template images 310$a$ to 310$z$ for the characters. The size of the template images 310$a$ to 310$z$ is set matching with the maximum size of the character being used. For each type of character (English alphabet and numerals) being used, the size can be set matching with the largest size for that type of character.

Figure 6A:
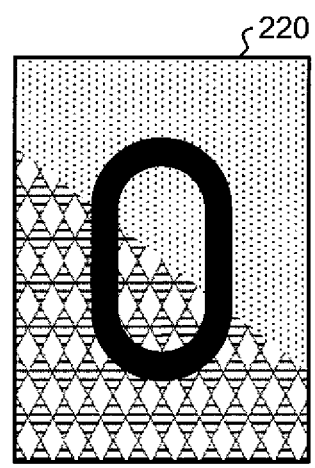
FIGS. 6A and 6B depict an example in which, during the creation of the template image, a different value from that shown in FIGS. 4A to 4D is used as a pixel value for filling a background area.
Figure 6B:
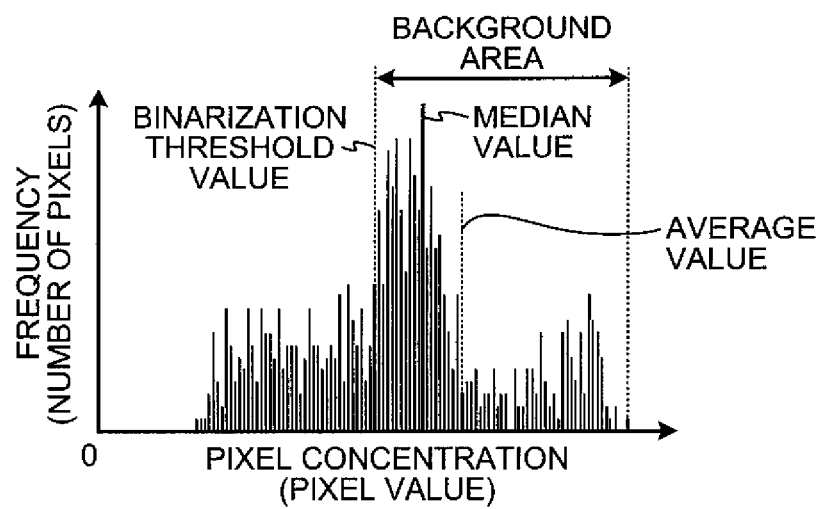

The pixel value used for filling the background area 211 is not limited to the average density value of the pixels forming the background area 211; a pixel value equivalent to the median value or the mode value can also be used depending on the background pattern. For example, in a character image 220 shown in FIG. 6A, the pixel distribution in the background area 211 is biased toward an area near the binarization threshold value, as shown in FIG. 6B. In such an instance, using the average value is determined to be inappropriate, the median value or the most frequent value is determined, and determined value is used for filling the background area 211 instead of using the average value. In the example shown in FIG. 6B, the median value, not the average value, is used as the pixel value for filling the background area 211. In this manner, the pixel value to be used for filling the background area 211 is determined in accordance with the distribution of the pixel values in the background area 211 included in the character images 210 and 220, that is, in accordance with the characteristics of the background pattern.

FIG. 7 is a flowchart of the creating process of the template images 310$a$ to 310$z$ for the characters. As explained above, first, the character image 210 for template image creation is acquired (Step S10), and the binarization threshold value is determined as the character-background separation threshold value from the histogram of the pixel values of the pixels forming the character image 210 (Step S11). Then, based on the binarization threshold value, the pixels forming the character and the background area 211 are separated (Step S12). Then, from the histogram of the pixels forming the background area 211 in the character image 210, the median value or the like of the pixel values of the background area 211 is determined as the pixel value to be used for filling the background area 211 (Step S13). Then, the background area 211 is filled by replacing the pixel values of the background area 211 with the determined pixel value (Step S14), and thereby the template images 310$a$ to 310$z$ are created.

The character recognition process that is performed by using the template images 310$a$ to 310$z$ created in the above manner is explained below. In the following explanation, the term template image 310 is used when referring to all the template images 310$a$ to 310$z$ for the characters and the blank template image 311.

In the character recognition apparatus 1, when the recognition target character image cutout 124 to be subjected to the character recognition process is acquired by the character image acquiring unit 20, the character recognition score calculating unit 11 scans with each template image 310 over the character image cutout 124 and calculates the character recognition score at each pixel position.

Figures 8A, 8B:
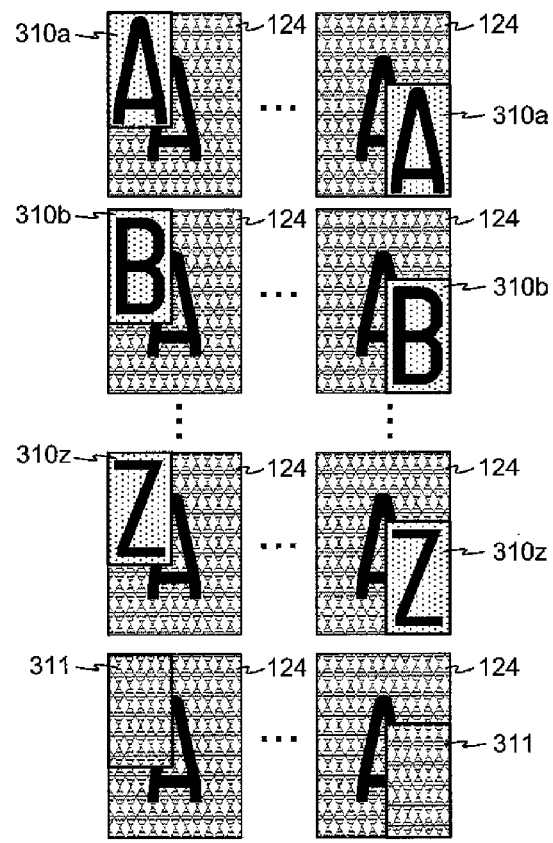
FIGS. 8A and 8B are drawings for explaining how a character recognition score is calculated by using the template image.

FIGS. 8A and 8B are drawings for explaining the character recognition score calculated by the character recognition score calculating unit 11. In FIG. 8A, the topmost drawing shows the character image cutout 124 being scanned with the template image 310$a$ for the character "A", followed by the template images 310$b$ to 310$z$ for each character and the blank template image 311. FIG. 8B is an example of the character recognition score for evaluating the degree of similarity between the character image cutout 124 and the template image 310.

Because the serial number 121 and 122 is printed at a designated position on the banknote, for example, the serial number image 123 and the character image cutout 124 shown in FIG. 3A can be cut out based on the information pertaining to the designated position on the banknote image 120. The area for cutting out each character image cutout 124 is set such that even if there is a shift in the printing position of the serial number 121 and 122, the cutout area includes the entire character. In contrast, the template image 310 is an image obtained by retaining the rectangle area including the entire character and removing the outer area thereof, and is formed by the entire character and a small area of the periphery thereof. Hence, as shown in FIG. 8A, a position where the character included in the template image 310 and the character included in the character image cutout 124 match is searched by scanning with the template image 310 over the entire surface of the character image cutout 124.

Specifically, for example, if the top left point of the character image cutout 124 is considered to be the starting point, the character recognition score for evaluating the degree of similarity between the two images is calculated at the position where the starting point is overlapped with the top left point of the template image 310. The character recognition score is similarly calculated at each pixel position by shifting the template image 310 from the current position to the right by one pixel at a time. Once the right edge of the character image cutout 124 and the right edge of the template image 310 are overlapped, the template image 310 is shifted to a position where one pixel below the starting point is overlapped with the top left point of the template image 310. Once again, the template image 310 is shifted to the right by one pixel at a time while calculating the character recognition score at each pixel position. The shifting of the template image 310 and calculation of the character recognition score is continued in this manner until the bottom right point of the character image cutout 124 is overlapped with the bottom right point of the template image 310. In this manner, the character recognition score is calculated at each pixel position while scanning the entire surface of the character image cutout 124.

The character recognition score is an evaluation value for evaluating the degree of similarity between the template image 310 and the character image cutout 124. The character recognition score calculating unit 11 regards the maximum value among the values obtained by scanning with the template image 310 over the character image cutout 124 as the character recognition score for each template image 310. For example, as shown in the topmost drawing in FIG. 8A, in the template image 310a of the upper case English alphabet "A" and the character image cutout 124 including the upper case English alphabet "A", the character recognition score attains the maximum value at the position where the two characters "A" are superposed.

For example, a normalized cross-correlation value R shown in FIG. 8B is used as the character recognition score. In FIG. 8B, (i,j) denotes coordinates on the character image cutout 124, I(i,j) denotes the pixel value of the character image cutout 124 at the position of the coordinates, and T(i,j) denotes the pixel value of the template image 310 at the position of the coordinates. In the example shown in FIG. 8B, the normalized cross-correlation value R corresponds to the template image 310 having a size of M pixels horizontally and N pixels vertically. The character recognition score is, however, not limited to the above; for example, a residual density, a square error of density, a phase only correlation coefficient, and the like that enable evaluation of the degree of similarity between the template image 310 and the character image cutout 124 can be used. The expression of R shown in FIG. 8B denotes the normalized cross-correlation value R at the starting point.

As shown in FIG. 8A, the character recognition score is calculated in a similar manner by scanning with the rest of the template images 310b to 310z and 311 over the character image cutout 124 including the character "A". However, the degree of similarity of the rest of the template images 310b to 310z and 311 with the character "A" included in the character image cutout 124 will be low, as will be the values of the character recognition score.

Figure 9:
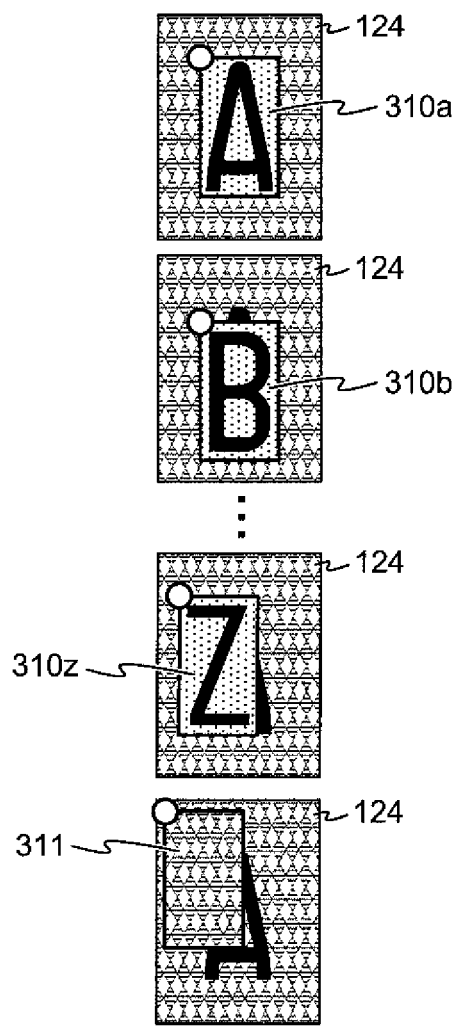
FIG. 9 illustrates an example of a result obtained in a character recognition process.

FIG. 9 is a drawing for explaining the positions of the template images 310 on the character image cutout 124 that includes the character "A" where the character recognition scores attain the maximum values. For the template image 310a for the character "A", the character recognition score attains the maximum value at the position where the character in the template image 310a and the character in the character image cutout 124 are superposed. In contrast, for the other template images 310b to 310z and 311, the character recognition score attains the maximum value at different positions in accordance with the pixels forming the character and the pixels of the background pattern. However, in all cases, the value of the character recognition score is smaller than the value of the character recognition score for the template image 310a.

The character determining unit 12 of the character recognition apparatus 1 determines the character recognition result based on the character recognition score obtained for each template image 310. In the examples shown in FIGS. 8 and 9, because the character recognition score of the template image 310a has the maximum value among the character recognition scores obtained for all the template images 310, the character determining unit 12 determines that the character recognition result indicating the character included in the character image cutout 124 is the upper case English alphabet "A" of the template image 310a.

The character recognition process is similarly performed for the character image cutout 124 of each digit forming the serial number 121 and 122 by using the template image 310 corresponding to the particular digit, and the character recognition result for each character image cutout 124 is determined. A character string formed by combining the character recognition results of the character image cutouts 124 of all the digits is output, as the character determination result of the serial number 121 and 122, to the outside from the character recognition processing unit 10 of the character recognition apparatus 1.

FIG. 10 is a flowchart of the character recognition process performed for the character image cutout 124 of each digit. First, the character image acquiring unit 20 acquires the character image cutout 124 forming the serial number 121 and 122 of the banknote (Step S20).

The character recognition processing unit 10 acquires the denomination information of the banknote, and the character recognition dictionary data 32 corresponding to the character image cutouts 124 is identified based on the acquired denomination information of the banknote. Then, the template images 310 included in the identified character recognition dictionary data 32 are read by the character recognition score calculating unit 11 (Step S21).

Next, the character recognition score calculating unit 11 scans with each template image 310 over the character image cutout 124 and calculates the character recognition score at each pixel position (Step S22). The calculation of the character recognition score is continued until the character recognition score is calculated at each pixel position while the character image cutout 124 is scanned with all the template images 310 (No at Step S23). For each template image 310, the maximum value among the character recognition scores obtained from all the pixel positions is determined to be the character recognition score.

When the calculation of the character recognition score is completed for all the template images 310 (Yes at Step S23), the character determining unit 12 compares the character recognition scores of all the template images 310. The character determining unit 12 determines that the template image 310 showing the maximum value among all the template images 310 corresponds to the character recognition result of the character image cutout 124 (Step S24). The character recognition result of the serial number 121 and 122 can be obtained by performing the processes of Steps S20 to S24 for the character image cutouts 124 of all the digits forming the serial number 121 and 122.

As explained above, according to the present embodiment, when performing character recognition of the characters printed on the valuable medium, the acquired character image cutout 124 is used as it is, without performing image processing to remove the background pattern or to extract the edges of the character. Consequently, the character recognition process can be performed while maintaining the information included in the character image cutout 124. Even when the background pattern is included in the character image cutout 124, the character recognition process can be performed accurately by using the character recognition dictionary data 32 comprising the template images 310 each of which the background area 21118 filled with a single color based on the characteristics of the background pattern.

Moreover, because the template image 310 corresponding to the character included in the character image cutout 124 is determined while searching for the character position by scanning with the template image 310 over the character image cutout 124 including the character, even if there is a shift in the characters printed on the valuable medium, character recognition can be performed accurately.

INDUSTRIAL APPLICABILITY

As explained above, the present invention is useful in performing character recognition of characters on a valuable medium in which the characters have a pattern printed in the background.

REFERENCE SIGNS LIST

1 Character recognition apparatus
10 Character recognition processing unit
11 Character recognition score calculating unit
12 Character determining unit
20 Character image acquiring unit
30 Memory unit
31 image data
32 character recognition dictionary data
100 Valuable medium
101 Character string
104, 105, 124 Character image
120 Banknote image
121, 122 Serial number
123 Serial number image
124 Character image
200 valuable medium
201 Character string
202, 210, 220 Character image (Target image for creating a template image)
211 background area
300, 301, 310, 310a to 310z, 311 template image

The invention claimed is:

1. A character recognition method for recognizing a character printed over a background pattern on a valuable medium, comprising:
capturing an image of the valuable medium;
cutting out an image of a partial area from the image of the valuable medium;
acquiring a character image from the image of the partial area, the character image including the character that is to be recognized, which is printed on the valuable medium;
evaluating a degree of similarity between the character image and each one of a plurality of template images; and
determining that the character corresponding to a template image showing the highest degree of similarity at the evaluating is the character included in the character image,
wherein the template images have been previously prepared for all characters that the valuable medium is likely to include, and
in each of the template images, a background area separated from a character is filled with a single pixel value that is determined in accordance with characteristics of the background area.

2. A character recognition method for recognizing a character printed over a background pattern on a valuable medium, comprising:
capturing an image of the valuable medium;
cutting out an image of a partial area from the image of the valuable medium;
acquiring a character image from the image of the partial area, the character image including the character that is to be recognized, which is printed on the valuable medium;
evaluating a degree of similarity between the character image and each of template images, the template images having been obtained beforehand by capturing each character that had a possibility of appearing on the valuable medium and of which background has been filled evenly; and
determining that the character corresponding to a template image showing the highest degree of similarity at the evaluating is the character included in the character image,
wherein the template image is an image having been obtained beforehand by separating the background area and the character by using a character-background separation threshold value determined from intensity distribution of pixel values of pixels of a captured image having been obtained beforehand by capturing the character printed on a valuable medium, and all pixel values of the background area of the template image have been filled and replaced with a predetermined pixel value determined based on distribution of pixel values of the pixels included in the background area of the captured image.

3. The character recognition method according to claim 1, wherein when there is a possibility that a recognition target in a character recognition process is the character image that does not include a character therein, an image containing only the background area is added to the template images.

4. The character recognition method according to claim 1 at the evaluating, the degree of similarity is evaluated by using a character recognition score that indicates an evaluation of the degree of similarity at each pixel position, and is calculated while scanning the entire surface of the character image with each of the template images.

5. The character recognition method according to claim 1, wherein at least one value of a residual density, a square error of density, a normalized cross-correlation, and a phase only correlation, determined based on the pixel values of the template image and the character image, is used as a character recognition score.

6. The character recognition method according to claim 1, wherein the valuable medium is a banknote.

7. The character recognition method according to claim 1, wherein the template images have been prepared according to the number of fonts used to print characters on the valuable medium.

8. A character recognition system that recognizes a character printed over a background pattern on a valuable medium, comprising:
a character image acquiring unit that captures an image of the valuable medium, cuts out an image of a partial area from the image of the valuable medium, and acquires a character image from the partial image, the character image including the character that is to be recognized, which is printed on the valuable medium;
a character recognition score calculating unit that calculates a character recognition score that indicates an evaluation of a degree of similarity between the character image and each one of a plurality of template images; and
a character determining unit that determines, based on the character recognition score calculated for each of the template images, that the character corresponding to a template image showing the highest degree of similarity is the character included in the character image, wherein the template images have been previously prepared for all characters that the valuable medium is likely to include, and in each of the template images, a background area separated from a character is filled with a single pixel value that is determined in accordance with characteristics of the background area.

9. A character recognition system that recognizes a character printed over a background pattern on a valuable medium, comprising:

a character image acquiring unit that captures an image of the valuable medium, cuts out an image of a partial area from the image of the valuable medium, and acquires a character image from the partial image, the character image including the character that is to be recognized, which is printed on the valuable medium;

a character recognition score calculating unit that calculates a character recognition score that indicates an evaluation of a degree of similarity between the character image and each of template images, the template images having been obtained beforehand by capturing each character that had a possibility of appearing on the valuable medium and evenly filling a background area thereof; and a character determining unit that determines, based on the character recognition score calculated for each of the template images, that the character corresponding to a template image showing the highest degree of similarity is the character included in the character image, wherein the template image is an image having been obtained beforehand by separating the background area and the character by using a character-background separation threshold value determined from intensity distribution of pixel values of pixels of a captured image obtained by capturing the character printed on a valuable medium, and all pixel values of the background area of the template image have been filled and replaced with a predetermined pixel value determined based on distribution of pixel values of the pixels included in the background area of the captured image.

10. The character recognition system according to claim 8, wherein when there is a possibility that a recognition target in a character recognition process is the character image does not include a character therein, an image containing only the background area is added to the template image.

* * * * *